United States Patent
Ryan et al.

(10) Patent No.: US 12,307,427 B2
(45) Date of Patent: May 20, 2025

(54) AUTOMATED BILL SPLITTING

(71) Applicant: American Express Travel Related Services Company, Inc., New York, NY (US)

(72) Inventors: Margaret H. Ryan, New York, NY (US); Ian T. Moritz, New York, NY (US); Adam Krochak, New York, NY (US)

(73) Assignee: American Express Travel Related Services Company, Inc., New York, NY (US)

(*) Notice: Subject to any disclaimer, the term of this patent is extended or adjusted under 35 U.S.C. 154(b) by 99 days.

(21) Appl. No.: 18/093,471

(22) Filed: Jan. 5, 2023

(65) Prior Publication Data
US 2024/0232833 A1    Jul. 11, 2024

(51) Int. Cl.
*G06Q 20/10*    (2012.01)
*G06Q 20/32*    (2012.01)
*G06Q 20/40*    (2012.01)

(52) U.S. Cl.
CPC ....... *G06Q 20/102* (2013.01); *G06Q 20/3255* (2013.01); *G06Q 20/4014* (2013.01)

(58) Field of Classification Search
CPC .................................................. G06Q 20/102
See application file for complete search history.

(56) References Cited

U.S. PATENT DOCUMENTS

| | | |
|---|---|---|
| 2012/0173396 A1 | 7/2012 | Melby et al. |
| 2014/0172704 A1 | 6/2014 | Atagun et al. |
| 2014/0279098 A1* | 9/2014 | Ham ............. G06Q 20/102 705/16 |
| 2017/0004468 A1 | 1/2017 | Stroeh et al. |
| 2020/0126052 A1 | 4/2020 | Deliwala et al. |
| 2020/0160296 A1* | 5/2020 | Park ............. G06Q 20/3223 |
| 2022/0005045 A1 | 1/2022 | Wu et al. |
| 2022/0400107 A1 | 12/2022 | Moshyedi |

* cited by examiner

*Primary Examiner* — Edward Chang
(74) *Attorney, Agent, or Firm* — Sterne, Kessler, Goldstein & Fox P.L.L.C.

(57) ABSTRACT

Disclosed herein are aspects for splitting a transaction. An example aspect begins by receiving transaction information specifying a transaction. The aspect continues by receiving split request information corresponding to the transaction. The split request information specifies how to split the transaction with one or more other parties. Next, the aspect sends, by a first user device, a split request to a second user device based on the split request information. The split request comprises input fields for each of the respective one or more other parties. These input fields include respective payer account identifier and actual payment amount fields. The aspect continues by receiving, based on an input from a user interface of the second user device, the payer account identifier and the actual payment amount. Lastly, the aspect sends a payment request to a payer account corresponding to the payer account identifier for the actual payment amount.

20 Claims, 5 Drawing Sheets

AUTOMATED BILL SPLITTING

BACKGROUND

Individuals often engage in transactions with merchants. In some situations, each of the individuals settles their portion of the transaction with the merchant. For example, each individual receives a bill from a restaurant for their portion of food. However, in other situations, one individual settles an entire transaction with a merchant, and the one or more other parties reimburse the paying individual. For example, if a group of colleagues eats at a restaurant, one individual may pay the bill and the other parties may reimburse the paying individual for their portion of food.

In the situation where one individual settles the entire transaction with the merchant, it can be difficult to coordinate reimbursement by the one or more other parties. It may be cumbersome to communicate information necessary to settle the reimbursement. Therefore, it is useful for the paying individual and/or payment device to have the ability to efficiently send payment requests to the one or more other parties.

SUMMARY

In an aspect, an example method for splitting a transaction is described. The method begins by receiving transaction information specifying a transaction. The transaction information includes at least one of merchant information, location information, time information, a transaction amount, or merchant point of sale system information. Then the method continues by receiving split request information corresponding to the transaction. The split request information is based on an input from a user interface of a first user device and specifies how to split the transaction with one or more other parties. Next, the method sends, by the first user device, a split request to a second user device based on the split request information. The split request comprises input fields for each of the respective one or more other parties. These input fields include respective payer account identifier and actual payment amount fields. The method continues by receiving, based on an input from a user interface of the second user device, the payer account identifier and the actual payment amount. Lastly, the method sends a payment request to a payer account corresponding to the payer account identifier for the actual payment amount.

System, device, and non-transitory computer-readable medium aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

In the drawings, like reference numbers generally indicate identical or similar elements. Additionally, generally, the left-most digit(s) of a reference number identifies the drawing in which the reference number first appears.

Aspects of the present disclosure will be described with reference to the accompanying drawings.

DETAILED DESCRIPTION

Provided herein are method, system, non-transitory computer-readable medium, and/or device aspects, and/or combinations and sub-combinations thereof for splitting a transaction. Automated splitting of transactions reduces the number of computer interactions needed, improving utilization of the network and computing resources. For example, by sending split requests based on overarching split request information, the network and computing resources can request payment from multiple devices without needing individual configurations for each device.

Figure 1:
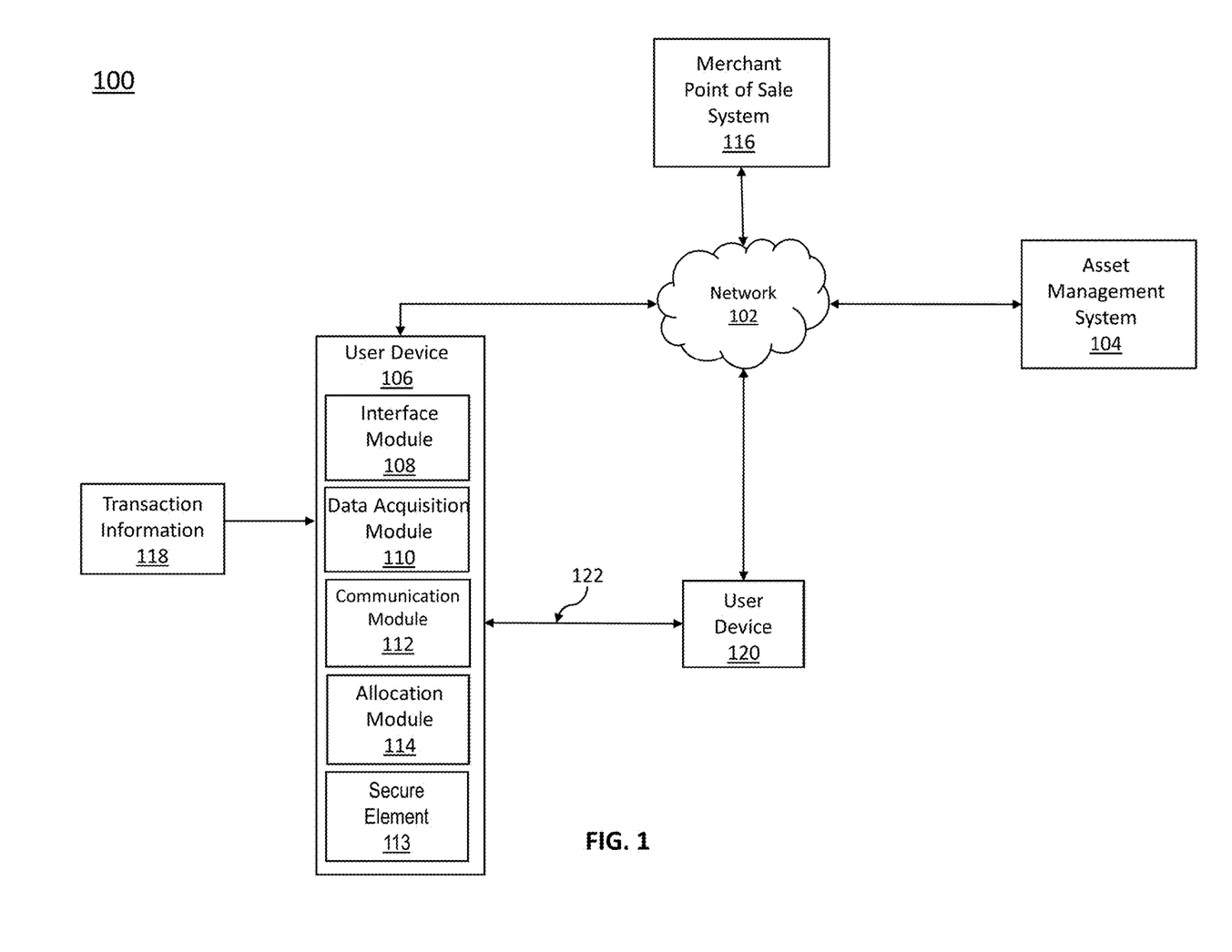
FIG. 1 is a block diagram of an example system for splitting a transaction, according to some aspects of the present disclosure.

FIG. 1 shows an example system 100 for splitting a transaction. System 100 is merely an example of one suitable system environment and is not intended to suggest any limitation as to the scope of use or functionality of aspects described herein. System 100 should not be interpreted as having any dependency or requirement related to any single device/module/component or combination of devices/modules/components described therein.

The system 100 may include a network 102. Network 102 may include a packet-switched network (e.g., internet protocol-based network), a non-packet switched network (e.g., quadrature amplitude modulation-based network), and/or the like. Network 102 may include network adapters, switches, routers, modems, and the like connected through wireless links (e.g., radiofrequency, satellite) and/or physical links (e.g., fiber optic cable, coaxial cable, Ethernet cable, or a combination thereof). Network 102 may include public networks, private networks, wide area networks (e.g., Internet), local area networks, and/or the like. Network 102 may provide and/or support communication from a telephone, cellular phone, modem, and/or other electronic devices to and throughout the system 100. For example, system 100 may include and support communications between user devices 106 and 120 and an asset management system 104 via network 102.

Asset management system 104 may include a payment network, a blockchain network, an asset transferal network, and/or may support/facilitate transactions (e.g., financial transactions, asset exchange transactions, cryptocurrency-related transactions, digital asset-related transactions, etc.).

Asset management system 104 may include a payment network that may provide, facilitate, and/or support one or more applications, and/or protocols, such as Amex® Pay, and the like. The payment network may facilitate transactions between merchants and card issuers. The payment network may approve or deny a purchase conducted at a merchant. The payment network may include an encryption to protect sensitive user data. The payment network may be configured to interact with one or more other payment networks. The payment network may be a Real-Time Payment (RTP) network. The RTP network may provide real-time payments from banking institutions.

User devices 106 and 120 may be configured to communicate with the payment network of asset management system 104 and transmit pull and push payment requests/messages. For example, the pull and push payment requests/messages may be payment requests/messages associated with transactions, inter-device payment requests and/or funds transferals, and/or the like. User devices 106 and 120 may be configured with an application and/or an application programming interface (API) that includes services, libraries, code, a combination thereof, and/or the like. The application and/or the API may enable user devices 106 and 120 to communicate with the payment network of asset management system 104 and send pull and push payment messages.

Asset management system 104 may include a blockchain. The blockchain may be a distributed database that maintains records in a readable manner and that is resistant to tampering. The blockchain may include a system of interconnected blocks containing data. The blocks can hold transfer data, smart contract data, and/or other information (e.g., digital assets, etc.) as desired. Each block may link to the previous block and may include a timestamp. When implemented in support of asset management system 104, the blockchain may serve as an immutable log for API transactions and related communications. The blockchain may be a peer-to-peer network that is private, consortium, and/or public (e.g., Ethereum, Bitcoin, etc.). Consortium and private networks may offer improved control over the content of the blockchain and public networks (e.g., network 102, etc.) may leverage the cumulative computing power of the network to improve security. The blockchain may be implemented using technologies, for example, Ethereum GETH, eth-light wallet, or other suitable blockchain interface technologies. The blockchain may be maintained on various nodes in the form of copies of the blockchain. Validation of API transactions may be added to the blockchain by establishing consensus between the nodes based on proof of work, proof of stake, practical byzantine fault tolerance, delegated proof of stake, or other suitable consensus algorithms.

Merchant point of sale system 116 can be a software system, a hardware system, or a combination thereof. Merchant point of sale system 116 can be configured to complete a sale between a merchant and customer, process a return between the merchant and customer, track inventory, track business performance, maintain a loyalty program, print receipts, etc. For example, merchant point of sale system 116 can complete a sale between a merchant and customer, can print a receipt for the customer, and can upload the sale information to a network for tracking of business performance. In some aspects, the sale information can be shared with other businesses (e.g., shared with asset management system 104 via network 102). Merchant point of sale system 116 can also be configured to transfer money from a customer's bank account or credit card account to the merchant's bank account.

User device 106 may include a smart device, a mobile device, a computing device, and/or any other device capable of communicating with network 102 and/or device/components in communication with network 102. Although user device 106 is shown and described in greater detail than user device 120, user devices 106 and 120 may be similarly configured and perform similarly and/or execute/operate with the same functionality. Additionally, system 100 can be configured to allow more than two user devices to communicate over network 102. For example, user devices 106 and 120 can communicate with as many other user devices as capable over network 102.

The user device 106 may include an interface module 108. Interface module 108 enables a user to interact with user device 106, network 102, user device 120, asset management system 104, merchant point of sale system 116, transaction information 118, and/or any other device/component of the system 100. Interface module 108 may include any interface for presenting and/or receiving information to/from a user.

Interface module 108 may include a web browser, a user interface of an application (e.g., AMEX PAY®, etc.), and/or the like. For example, if a user desires to split a transaction with one or more other parties, they can input split request information on an application to begin the split. The transaction information and/or a prompt, alert, or input field prompting a user to input split request information for the transaction can be presented on user interface. The split request information specifies how to split the transaction with one or more other parties who owe a portion of the transaction total (e.g., owe a portion of the restaurant bill). The split request information can include at least the number of other parties to split the transaction. Based on the number of other parties selected to split the transaction, the split request information can include various fields. For example, the split request information can include respective suggested payment amounts for each of the other parties. The respective suggested payment amounts can be manually inputted, or can be automatically generated. For example, if a receipt is uploaded by a user or a merchant (i.e., through merchant point of sale system 116). The system can then allow a user to allocate portions of the transaction to respective other parties based on the detected text. The suggested payment amounts can also include a respective portion of a tip amount placed on the transaction based on the number of other parties who are selected to split the transaction.

Additionally, the split request information can include a picture of a receipt corresponding to the transaction (e.g., a picture of a dinner bill from a restaurant), a tip amount corresponding to the particular transaction (e.g., a tip for a waiter at a restaurant), a mode for reminding the other parties of their obligation to pay their portion of the bill (e.g., SMS, MMS, Venmo® Account, etc.), a frequency of reminding the other parties of their obligation to pay their portion of the bill, an account for the payee in which fulfillments can be deposited (e.g., bank account number, Venmo® handle, PayPal® handle, etc.), or a mode for sending the split request information to the other parties. The mode for sending the split request information can include QR code, SMS, MMS, Wi-Fi, Bluetooth, etc.

The split request information can generate a split request webpage on interface module 108. The split request can include the transaction amount, the suggested payment amounts for each of the other parties, a picture of a receipt corresponding to the transaction, or a transaction tip amount. The split request can include input fields for each of the respective one or more other parties. For example, the input fields can include respective payer account identifier (e.g., bank account number, Venmo® handle, PayPal® handle, etc.) and actual payment amount fields. The other parties, through the interface on their devices (e.g., interface module on user device 120), can input values corresponding to each of the input fields, such as their respective payer account identifiers and the amount of the total transaction they will pay (i.e., actual payment amount).

Interface module 108 can provide a prompt, alert, or notification on user device 106 when the one or more other parties access the split request webpage. Interface module 108 can provide a prompt, alert, or notification on user device 106 when split requests are fulfilled by the one or more other parties.

Other software, hardware, and/or interfaces can be used to provide communication between user device 106, network 102, user device 120, asset management system 104, transaction information 118, and/or any other device/component of the system 100. Interface module 108 may be used to display, request, and/or send data/information from a local source and/or a remote source, such as network 102, user device 120, asset management system 104, transaction information 118, and/or any other device/component of the system 100. Interface module 108 may be and/or may include any interface for presenting and/or receiving information to/from a user.

Interface module 108 may include one or more input devices and/or components, for example, such as a keyboard, a pointing device (e.g., a computer mouse, remote control), a microphone, a joystick, a tactile input device (e.g., touch screen, gloves, etc.), and/or the like. Input devices and/or components of interface 108 may include hardware input devices and/or components, software input devices and/or components, virtual input devices and/or components, physical input devices and/or components, and/or the like. Interaction with the input devices and/or components may enable a user to view, access, request, and/or navigate a user interface generated, accessible, and/or displayed by interface module 108. Interaction with the input devices and/or components may enable a user to manipulate and/or interact with components of a user interface.

User device 106 may include a data acquisition module 110 for capturing and/or receiving data/information. For example, data acquisition module 110 may include an imaging device/component (e.g., a camera, an imaging sensor, etc.), a data source (e.g., a quick response (QR) code, a near field communication (NFC) tag, a barcode, a watermark, transaction information 118, etc.) scanner, and/or the like for capturing and/or receiving data/information, such as transaction information 118. Data acquisition module 110 can also include a processing module for processing transaction information 118 or information from merchant point of sale system 116. Data acquisition module 110 can include a text detection system for detecting text from a receipt to be dispersed for splitting a transaction. For example, the text detection system may be configured to use optical character recognition to detect and extract text from the receipt. The text detection system may alternatively be configured to use glyph recognition to detect and extract text from the receipt. The text detection system may be a machine learning or artificial intelligence system, such as a Convolutional Neural Network. The text detection system may use an image-based approach that segments images into several pixel segments that have similar attributes.

Data acquisition module 110 may be used to acquire data/information, such as transaction data, imaging data, and/or the like, of transaction information 118. Transaction information 118 may be and/or may include, but is not limited to, merchant information (e.g., merchant name), location information (e.g., city, state, zip code, country, etc.), time information (e.g., date and time), a transaction amount, merchant point of sale system information, a bill for products and/or services rendered, a receipt, a contract, an indication of an engagement arrangement, and/or the like. Transaction information may indicate that the transaction is a pending transaction or an authorized transaction. A pending transaction may be a transaction that has been sent to data acquisition module 110 from a merchant point of sale system, but has not been fully processed by the merchant. For example, a user of the user device 106 or 120 may position a camera of the data acquisition module 110 to capture image data of transaction information 118 depicting transaction items. A user of the user device 106 or 120 may use data acquisition module 110 to scan and/or decode a QR code (and/or any other encoder indicator) indicative of transaction information 118 depicting transaction items or a configured split request. A user of the user device 106 may use data acquisition module 110 (and/or any other component of user device 106) to acquire transaction information 118 by any means.

Transaction information 118 may be displayed to a user of user device 106, for example, via interface module 108 and/or the like.

User device 106 may include a communication module 112 that facilitates and/or enables communication with network 102 (e.g., devices, components, and/or systems of the network 102, etc.), asset management system 104 (e.g., devices, components, and/or systems of asset management system 104, etc.), user device 120, merchant point of sale system 116, and/or any other device/component of the system 100. Communication module 112 may include any hardware and/or software necessary to facilitate communication including, but not limited to a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. For example, communication module 112 may include multiple radio interfaces that support various wireless communication protocols and/or standards (e.g., Wi-Fi, BLUETOOTH™, LTE, LTE-A, ZigBee, Ant+, near field communications (NFC), UWB (Ultra-wideband), 3G, 4G, 5G, PCS, GSM, etc.). Accordingly, the UE may need to simultaneously operate multiple radio interfaces corresponding to multiple wireless communication protocols and/or standards. Communication module 112 enables wireless, peer-to-peer, ad hoc, automatic, self-configuring high-speed networking between user devices.

Communication module 112 may use a communication protocol 122 (e.g., Bluetooth, NFC, etc.) to detect, determine, and/or identify user devices, for example, user device 120 in proximity to user device 106. Communication module 112 may detect, determine, and/or identify user devices, for example, user device 120 in proximity to user device 106 in response to activation and/or the initiation of an application (e.g., AMEX PAY®, etc.) and/or the like configured with user device 106.

Communication module 112 may use a communication protocol 122 (e.g., Ultra-wideband (UWB), Wi-Fi Direct, peer-to-peer Wi-Fi, Nearby Share, Multipeer Connectivity, infrared, etc.) to facilitate a peer-to-peer, ad hoc, and high-speed network between user device 106 and any user device detected, determined, and/or identified, for example, user device 120, via protocol 122 and/or selected and/or identified via interaction with interface module 108 and/or the like. Ultra-wideband is a radio technology that can use a very low energy level for short-range, high-bandwidth communications over a large portion of the radio spectrum. An example is an AWDL (Apple Wireless Direct Link) communications protocol, which is a low latency/high-speed WiFi peer-to peer-connection used in the AIRDROP communication product available from Apple Inc. of Cupertino, CA.

To manage asset transferal, user device 106 may include an allocation module 114. Allocation module 114 may be initiated, supported by, in communication with, and/or the like an application (e.g., AMEX PAY®, etc.) and/or the like configured with user device 106. Allocation module 114 may include and/or be associated with a digital wallet. The digital wallet may include payment information and passwords associated with the user device 106 (e.g., associated with a user of the user device 106). For example, the digital wallet may include payment card information. The payment card may be associated with a primary account number (PAN). The PAN may be tokenized for security. The PAN associated with the user device 106 may be stored by asset management system 104 (e.g., a payment network configured with, supported by, and/or enabled by asset management system 104, etc.) in a database record linked to a payment account (and/or user profile) associated with a user (e.g., a user associated with and/or using the user device 106, etc.). The payment account may be maintained/controlled by asset management system 104 (e.g., via an entity of asset management system 104, AMEX®, etc.). As previously described, asset management system 104 may include and/or be part of a device/network associated with a financial institution that issues payment accounts. Monetary assets and/or the like may be transferred between payment accounts associated with user device 106 and user device 120 (and/or users of user device 106 and user device 120, etc.).

Allocation module 114 may include and/or be associated with a crypto wallet (e.g., software, hardware, and/or the like that enables user device 106 to store and use cryptocurrency, etc.). A crypto wallet may be an on-chain crypto wallet, an off-chain crypto wallet (e.g., a cold wallet, a warm wallet, etc.), and/or the like. For example, a crypto wallet may enable and/or facilitate digital assets to be stored (e.g., securely stored, etc.) locally on a storage of and/or associated with the user device 106. A crypto wallet enables transactions to occur with a username and/or identifier that can be associated with a public key address on a blockchain of asset management system 104. User device 106 may utilize a crypto wallet to send and/or receive cryptocurrency assets, payments, and/or the like. The crypto wallet can be used to store a user's public and private keys for accessing and using cryptocurrency. In scenarios where the crypto wallet includes an off-chain crypto wallet, digital assets may be in custody of the user device 106 (and/or user of the user device 106) and stored locally by secure element 113 and/or another storage element of and/or associated with the user device 106. Cryptocurrencies (e.g., Bitcoin, Ethereum, etc.), crypto tokens (e.g., ERC-20, Dogecoin, etc.), and/or the like may be transferred between crypto wallets and/or crypto accounts associated with user device 106 and user device 120 (and/or users of user device 106 and user device 120, etc.).

User device 106 may include a secure element 113. Secure element 113 is configured to be protected from unauthorized access and may be used by the user device 106 to interact/communicate with allocation module 114 to manage and/or store confidential data, cryptographic data, and/or the like. Secure element 113 may enable trusted applications, device components (e.g., digital wallets, crypto wallets, etc.) and/or devices (e.g., POS terminals, merchant devices, loan management terminals, etc.) read and/or write access to storage and/or data of the secure element 113. Secure element 113 may be configured to detect and/or identify any hacking and/or modification attempts, perform cryptographic functions including, but not limited to cryptographically secure generation of random numbers and/or keys (e.g., pairs of private and public keys for asymmetric encryption, etc.). Secure element 113 may include secure memory for storing private encryption keys, bank card details, digital assets, and/or any other information securely. Secure element 113 may store keys for digitally signing documents or other data, as well as generating a signature. Secure element 113 may store and/or facilitate cryptocurrency wallets and/or the like. Secure element 113 may store biometric data/information and/or facilitate safe storage and/or transfer of sensitive data.

Figure 2A:
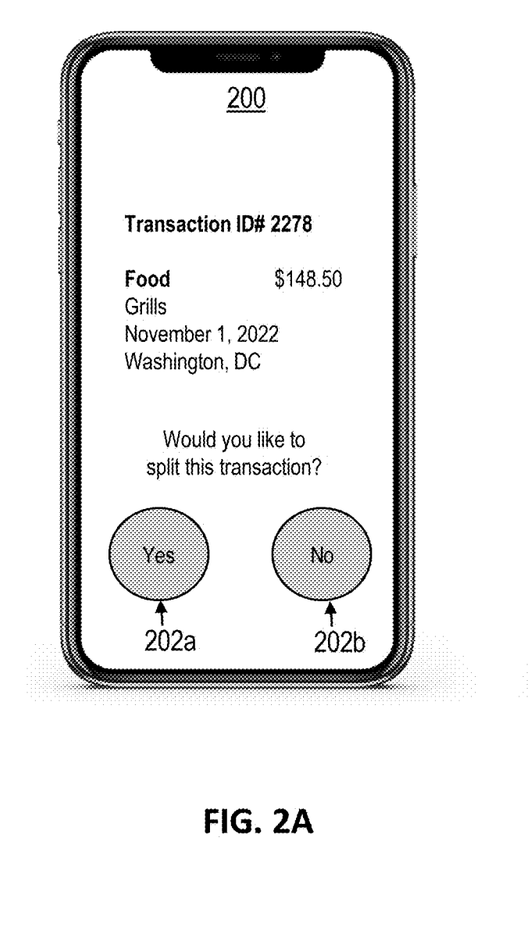
FIGS. 2A-2B are example views of user interfaces when splitting a transaction, according to some aspects of the present disclosure.
Figure 2B:
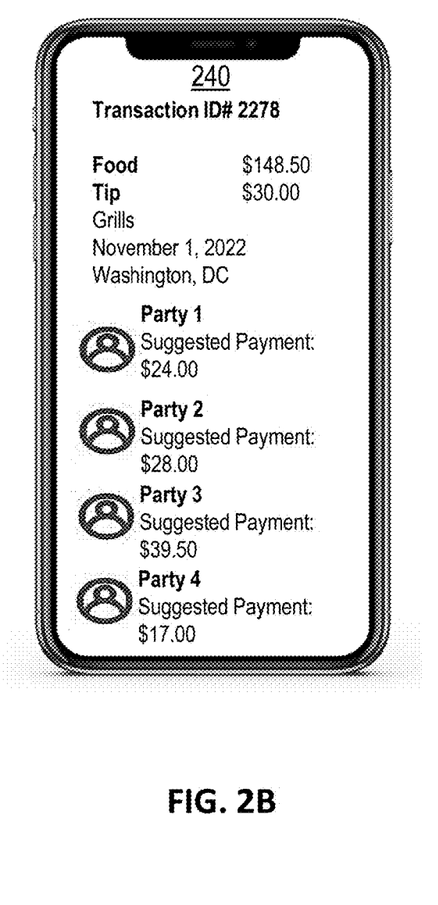

FIGS. 2A-2B are example views of user interfaces when splitting a transaction. FIG. 2A is a user interface 200 of transaction information (e.g., transaction information 118) specifying a transaction, and a prompt to input split request information for the transaction. The transaction information can include merchant information (e.g., merchant name), location information (e.g., city, state, zip code, country, etc.), time information (e.g., date and time), a transaction amount, merchant point of sale system information, a bill for products and/or services rendered, a receipt, a contract, an indication of an engagement arrangement, and/or the like. Transaction information may indicate that the transaction is a pending transaction or an authorized transaction.

The transaction information and/or a prompt, alert, or input field prompting a user to input split request information for the transaction can be presented on user interface 200 (e.g., user interface of user device 106). For example, a user can be prompted with a "Yes" input field 202a and a "No" input field 202b, corresponding to the question of whether they would like to split this transaction (i.e., whether they would like to input split request information for the transaction). If the user selects input field 202a through their user device (e.g., user device 106), then the user interface can transition to a user interface 240 to input the split request information.

FIG. 2B is a user interface 240 for inputting split request information for the transaction (e.g., appearing on interface module 108 of user device 106, appearing on a first user device). The split request information specifies how to split the transaction with one or more other parties who owe a portion of the transaction total (e.g., owe a portion of the restaurant bill). The split request information can include at least the number of other parties to split the transaction. Based on the number of other parties selected to split the transaction, the split request information can include various fields. For example, the split request information can include respective suggested payment amounts for each of the other parties. The respective suggested payment amounts can be manually inputted, or can be automatically generated. Automatically generated amounts can be adjusted by manual input. For example, if a receipt is uploaded by a user or a merchant (i.e., through merchant point of sale system 116), the text of the receipt can be detected by a system (e.g., data acquisition module 110). The system can then allow a user to allocate portions of the transaction to respective other parties based on the detected text. For example, if a restaurant receipt reads (1) Steak—$30.00, (2) Chicken—$20.00, (3) Salmon—$25.00, the system can detect this text and allow the user to suggest respective amounts (1) $30.00, (2) $20.00, (3) $25.00 to three other parties for respective payments. The suggested payment amounts can also include a respective portion of a tip amount placed on the transaction based on the number of other parties who are selected to split the transaction. For example, if a payee places a $20.00 tip on a transaction, and three other parties are splitting the transaction, suggested payment amounts for the other parties can include an additional $5.00 for respective portions of the transaction tip amount.

Additionally, the split request information can include a picture of a receipt corresponding to the transaction (e.g., a picture of a dinner bill from a restaurant), a tip amount corresponding to the particular transaction (e.g., a tip for a waiter at a restaurant), a mode for reminding the other parties of their obligation to pay their portion of the bill (e.g., SMS, MMS, Venmo® Account, etc.), a frequency of reminding the other parties of their obligation to pay their portion of the bill, an account for the payee in which fulfillments can be deposited, or a mode for sending the split request information to the other parties. The mode for sending the split request information can include QR code, SMS, MMS, Wi-Fi, Bluetooth, etc.

Figure 3A:
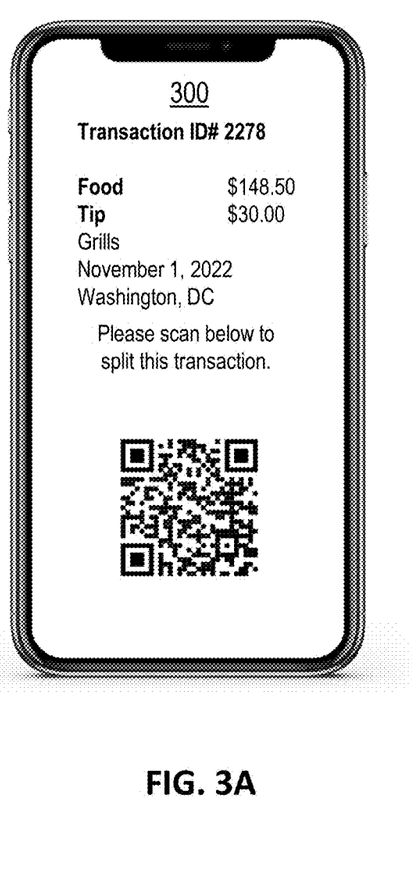
FIGS. 3A-3C are example views of user interfaces when splitting a transaction, according to some aspects of the present disclosure.
Figure 3B:
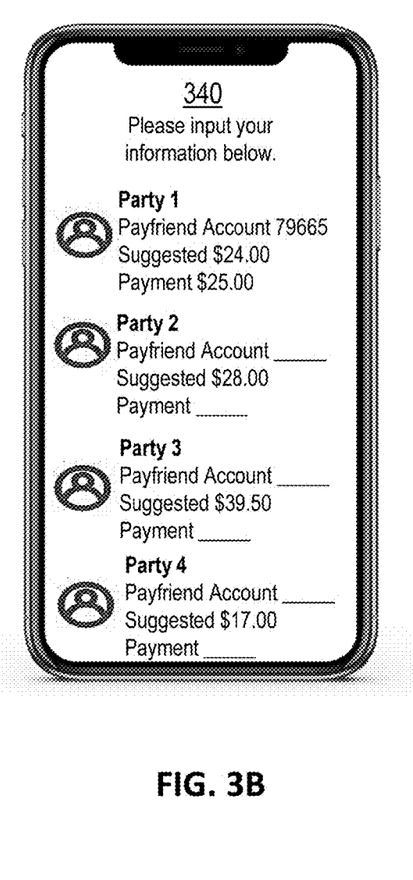
Figure 3C:
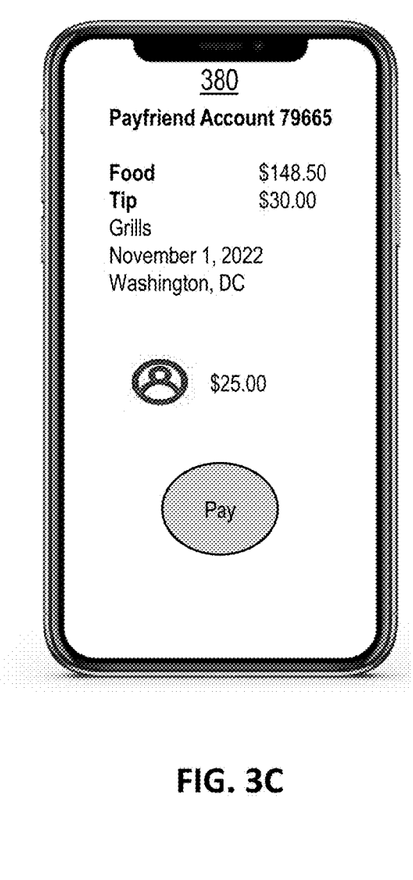

FIGS. 3A-3C are example views of user interfaces when splitting a transaction. FIG. 3A is a user interface 300 for sending a split request based on split request information. In some aspects, where a user knows contact information for each of the other parties owing a portion of the transaction, the split request can be sent directly to those payment accounts. The split request can be sent by the user's device (e.g., user device 106, a first user's device). For example, the split request can be sent via SMS or MMS. In other aspects, where a user does not know contact information for each of the other parties owing a portion of the transaction, the split request can be shared over Wi-Fi, Bluetooth, or via a QR code. For example, a first user device (e.g., user device 106) can display a visual code that encodes information that can be read visually by another device (e.g., user device 120) with a camera (e.g., data acquisition module of user device 120). The visual code can be displayed on the device's user interface (e.g., user interface 300, interface module 108 of user device 106). The visual code can be a barcode. An example of a barcode is a Quick Response (QR) code. The QR code can correspond to the transaction. In this example, upon scanning the QR code, the other parties can be presented with the split request on their user interfaces (e.g., interface module of user device 120). How the split request is sent to user devices of each of the other parties is based on the split request information.

FIG. 3B is a user interface 340 of a split request based on the split request information. The split request can appear as a webpage on an interface module (e.g., on user interface 340), where the webpage includes various information and input fields. User interface 340 would appear on user devices (e.g., interface module of user device 120) after being shared from the user's device (e.g., user device 106). The split request can include the transaction amount, the suggested payment amounts for each of the other parties, a picture of a receipt corresponding to the transaction, or a transaction tip amount. The split request can include input fields for each of the respective one or more other parties. For example, the input fields can include respective payer account identifier (e.g., bank account number, Venmo® handle, PayPal® handle, etc.) and actual payment amount fields. The other parties, through the interface on their devices (e.g., interface module on user device 120), can input values corresponding to each of the input fields, such as their respective payer account identifiers and the amount of the total transaction they will pay (i.e., actual payment amount).

User interface 340 can display the split requests for all of the one or more other parties, or can display the split request individually for respective ones of the other parties. In aspects where the split requests are displayed for all of the one or more other parties, each party may be able to view suggested and actual payment amounts for each of the other parties. In some aspects, when one of the other parties' inputs their actual payment amount (e.g., through interface module of user device 120), the suggested payment amounts for each of the other parties is updated. For example, if one of the other parties inputs an actual payment amount greater than their suggested payment amount, the suggested payment amounts for each of the other parties may decrease.

Once split requests are fulfilled (e.g., at least the payer account identifier and the actual payment amount are received for the one or more other parties who owe a portion of the transaction), the first user can receive a notification (e.g., receiving a notification on interface module 108 of user device 106). A notification can be sent when each of the individual other parties fulfill their individual requests or when they all have.

Once all or a portion of the split requests are fulfilled, a payment request can be sent to each of the user devices for each of the one or more other parties for payment fulfillment. The payment requests can be sent from the first user's device (e.g., user device 106).

FIG. 3C is a user interface 380 of a payment request in a payer account. The payer account can correspond to the payer account identifiers originally entered in response to the split requests. The payment request can be for the actual payment amount for the respective user.

Once one or all of the one or more other parties have fulfilled the payment requests, the first user can receive a notification on their user device (e.g., user device 106). The payment requests may be considered fulfilled once financial institutions of the one or more of the other parties have sent their respective amounts to the payee's account. Once the payment requests are fulfilled, the first user can access or transfer the received funds, or a payment network can allocate the received funds as a statement credit toward the transaction.

Figure 4:
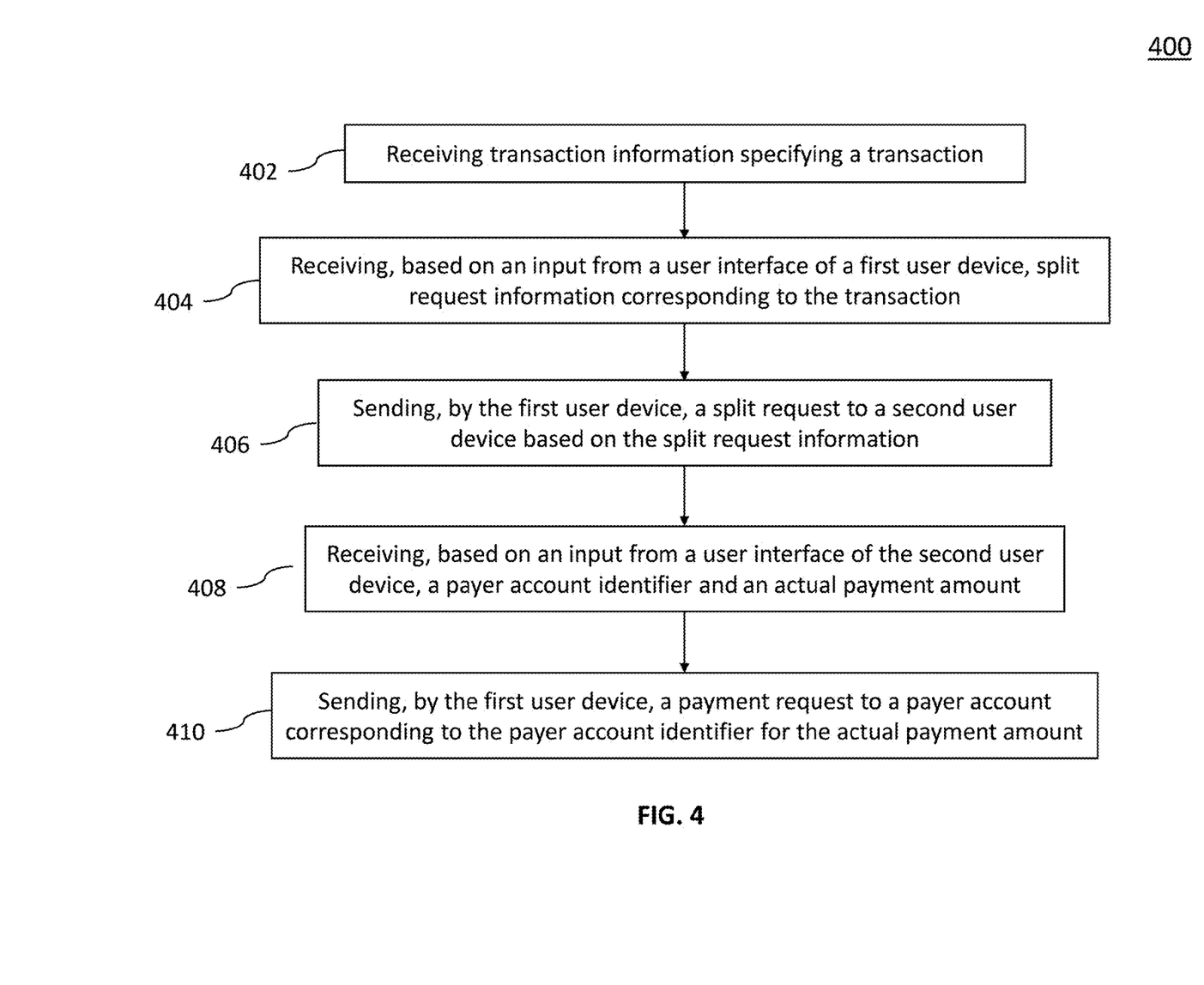
FIG. 4 is a flowchart of a method for splitting a transaction, according to some aspects of the present disclosure.

FIG. 4 is a flowchart for a method 400 for splitting a transaction, according to an aspect of the invention. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 can be implemented by system 100 and operations caused by computer system 500. However, method 400 is not limited to that example aspect.

In 402, transaction information specifying a transaction is received. The transaction information can include merchant information (e.g., merchant name), location information (e.g., city, state, zip code, country, etc.), time information (e.g., date and time), a transaction amount, merchant point of sale system information, a bill for products and/or services rendered, a receipt, a contract, an indication of an engagement arrangement, and/or the like. Transaction information may indicate that the transaction is a pending transaction or an authorized transaction.

In 404, split request information corresponding to the transaction from 402 is received. The split request information is based on an input from a user interface of a first user device. The split request information can include at least a number of one or more other parties to split the transaction. Based on the number of other parties selected to split the transaction, the split request information an include various fields. For example, the split request information can include respective suggested payment amounts for each of the other parties. The respective suggested payment amounts can be manually inputted, or can be automatically generated. The suggested payment amounts can also include a respective portion of a tip amount placed on the transaction based on the number of other parties who are selected to split the transaction.

Additionally, the split request information can include a picture of a receipt corresponding to the transaction (e.g., a picture of a dinner bill from a restaurant), a tip amount corresponding to the particular transaction (e.g., a tip for a waiter at a restaurant), a mode for reminding the other parties of their obligation to pay their portion of the bill (e.g., SMS, MMS, Venmo® Account, etc.), a frequency of reminding the other parties of their obligation to pay their portion of the bill, an account for the payee in which fulfillments can be deposited, or a mode for sending the split request information to the other parties. The mode for sending the split request information can include QR code, SMS, MMS, Wi-Fi, Bluetooth, etc.

In 406, a split request is sent by the first user device from 404 to a second user (i.e., one of the one or more other parties) device based on the split request information.

In some aspects, where a user knows contact information for each of the other parties owing a portion of the transaction, the split request can be sent directly to those payment accounts. The split request can be sent by the user's device. For example, the split request can be sent via SMS or MMS. In other aspects, where a user does not know contact information for each of the other parties owing a portion of the transaction, the split request can be shared over Wi-Fi, Bluetooth, or via a QR code. For example, the first user device can display a visual code that encodes information that can be read visually by another device (e.g., the second user device) with a camera. The visual code can be a barcode. An example of a barcode is a Quick Response (QR) code. The QR code can correspond to the transaction. In this example, upon scanning the QR code, the second user device can be presented with the split request. How the split request is sent to user devices of each of the other parties is based on the split request information.

The split request can appear as a webpage on an interface module, where the webpage includes various information and input fields. The split request can include the transaction amount, the suggested payment amounts for each of the other parties, a picture of a receipt corresponding to the transaction, or a transaction tip amount. The split request can include input fields for each of the respective one or more other parties. For example, the input fields can include respective payer account identifier (e.g., bank account number, Venmo® handle, PayPal® handle, etc.) and actual payment amount fields. Each party may be able to view suggested and actual payment amounts for each of the other parties on the split request webpage.

In 408, a payer account identifier and an actual payment amount are received based on an input from a user interface of the second user device. In some aspects, when the second user (e.g., one of the one or more other parties) inputs their actual payment amount, the suggested payment amounts for each of the other parties is updated.

In 410, a payment request is sent to a payer account. The payer account corresponds to the payer account identifier for the actual payment amount from 408. The payment request can be sent once all, or a portion, of the split requests are fulfilled.

Figure 5:
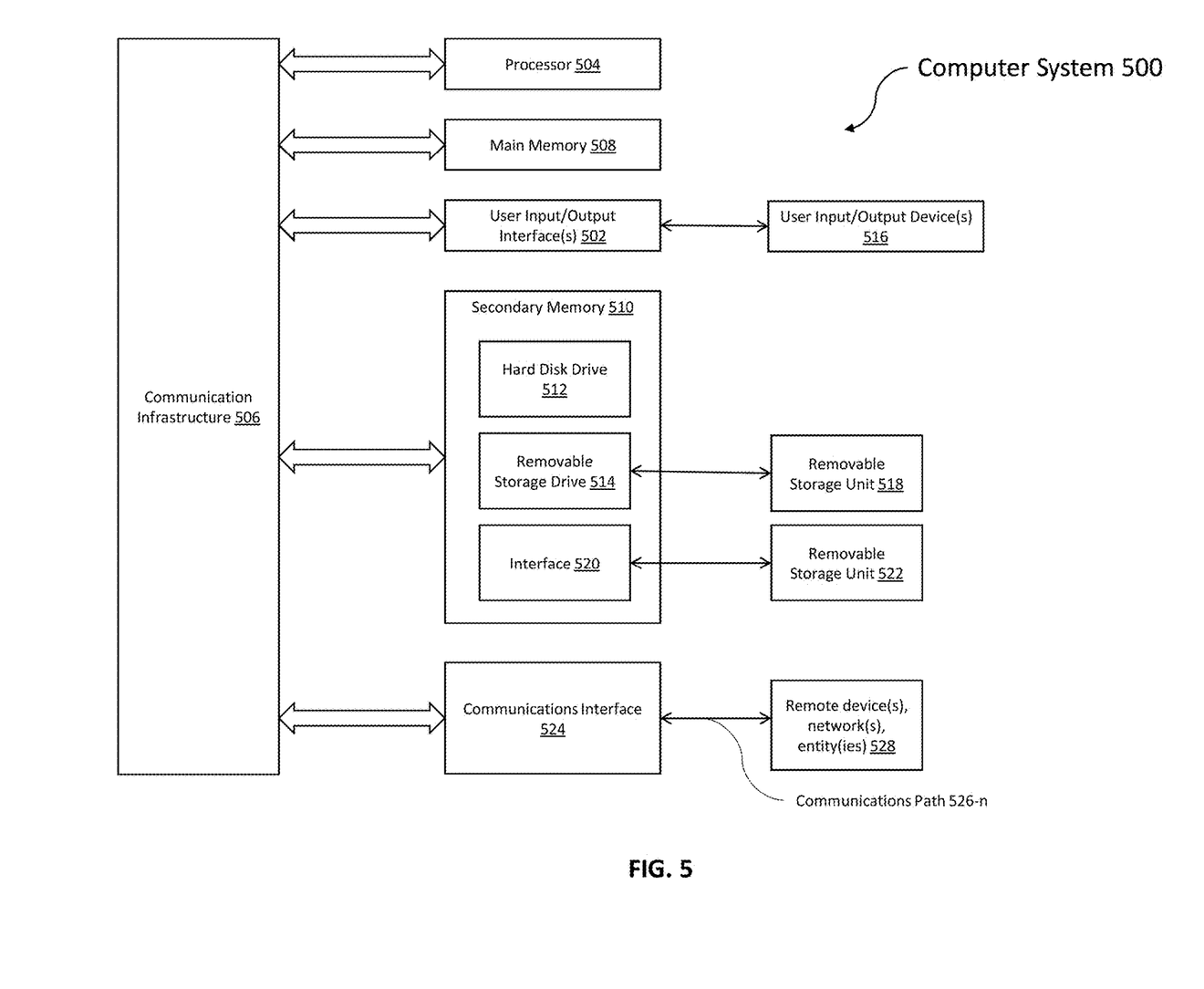
FIG. 5 is a block diagram of an example computer system useful for implementing various aspects.

Various aspects can be implemented, for example, using one or more computer systems, such as computer system 500 shown in FIG. 5. Computer system 500 can be used, for example, to implement a system for splitting a transaction. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 516, such as monitors, keyboards, pointing devices, etc., that communicate with communication infrastructure 506 through user input/output interface(s) 802.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary aspect, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 5. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer-implemented method for splitting a transaction, comprising:
  receiving, by one or more computer processors, from a payment network, transaction information specifying the transaction, after the transaction has been processed by the payment network based on payment account information of a payment account associated with a first user, wherein the transaction information includes at least one of merchant information, location information, time information, a transaction amount, or merchant point of sale system information;
  transmitting, by the one or more computer processors, the transaction information to a first user device associated with the first user, via a communication network communicatively coupling the first user device and the one or more computer processors, wherein the first user device comprises a camera and is configured to:
    receive the transaction information from the one or more computer processors via the communication network;
    display on the first user device a split option query user interface based on the transaction information, the split option query user interface presenting a split option control by which the first user may indicate that the transaction should be split; and
    based on an affirmative input to the split option control:
      acquire a picture of a bill or receipt associated with the transaction via the camera;
      populate a split request adjustment user interface, displayed by the first user device, with values based on the transaction information and the picture of the bill or receipt, the values including automatically generated suggested payment amounts each corresponding to either the first user or to one of one or more other parties;
      display, on the first user device, the split request adjustment user interface, including manual adjustment controls by which the first user may enter one or more requested payment amount inputs to manually adjust the suggested payment amounts to create corresponding one or more requested payment amounts; and
      display, on the first user device, a Quick Response (QR) code corresponding to the transaction after creating the one or more requested payment amounts;
  receiving, by the one or more computer processors, from the first user device, via the communication network, based on the one or more requested payment amount inputs from a to the split request adjustment user interface, split request information corresponding to the transaction, wherein the split request information specifies how to split the transaction with the one or more other parties, the split request information including the one or more requested payment amounts and identifiers for corresponding ones of the one or more other parties;

generating, by the one or more computer processors, based on the split request information, including the one or more requested payment amounts, a split request webpage,
- wherein the QR code encodes a split request link to the split request webpage,
- wherein the first user device is further configured to send sending, the split request link to a second user device, associated with a second user from among the one or more other parties, based on the split request information, via the QR code as displayed on the first user device,
- wherein, when the split request webpage is rendered in a web browser of the second user device, the split request webpage comprises:
  - respective input fields for each of the one or more other parties, including a respective payer account identifier field and a requested payment amount fields that is initially populated with a corresponding one of the one or more requested payment amounts,
  - a manual adjustment control of a user interface of the web browser of the second user device configured to receive a manual adjustment of one of the one or more requested payment amounts, wherein the manual adjustment comprises an adjustment to an amount of the transaction the second user will pay, to create a corresponding one of actual payment amounts associated with the transaction, and
  - an input of the user interface of the web browser of the second user device configured to receive an entry of a payer account identifier of the second user;

sending, by the one or more computer processors, the split request webpage to the second user device;

receiving, by the one or more computer processors, based on the input of the user interface of the web browser of the second user device after rendering the split request webpage, the payer account identifier of the second user and the corresponding one of the actual payment amounts for the second user;

sending, by the one or more computer processors, a payment request for the corresponding one of the actual payment amounts for the second user to a payer account corresponding to the payer account identifier of the second user; and instructing, by the one or more computer processors, transfer of monetary assets in the corresponding one of the actual payment amounts for the second user from a payment account associated with the second user to the payment account associated with the first user.

2. The method of claim 1, wherein the split request information further includes the picture of the bill or receipt, a transaction tip amount, a reminder mode value, a reminder frequency value, and a payee account identifier.

3. The method of claim 1, wherein the suggested payment amounts are automatically generated based on text detected from the picture of the bill or receipt associated with the transaction.

4. The method of claim 1, wherein the split request adjustment user interface of the first user device is configured to permit the first user to populate or modify a transaction tip amount in the split request adjustment user interface, and wherein the one or more requested payment amounts in the split request webpage each include a respective requested portion of the transaction tip amount that is based on the transaction tip amount.

5. The method of claim 1, wherein the split request comprises a webpage displays the input fields, the transaction amount, the one or more requested payment amounts for each of the other parties, the picture of the bill or receipt corresponding to the transaction, and a transaction tip amount.

6. The method of claim 1, further comprising:
generating a notification on the first user device when the payer account identifier and the corresponding one of the actual payment amount amounts for the second user are received.

7. The method of claim 1, further comprising:
generating a notification on the first user device when the payment request to the payer account of the second user for the corresponding one of the actual payment amount amounts for the second user is fulfilled.

8. A system for splitting a transaction, comprising:
a payment network; and
a computing device comprising a processor and a memory, wherein the computing device is communicatively coupled to the payment network and wherein the memory contains instructions stored thereon that when executed by the processor cause the computing device to perform operations comprising:
- receiving, from the payment network, transaction information specifying the transaction, after the transaction has been processed by the payment network based on payment account information of a payment account associated with a first user, wherein the transaction information includes at least one of merchant information, location information, time information, a transaction amount, or merchant point of sale system information;
- transmitting the transaction information to a first user device associated with the first user, via a communication network communicatively coupling the first user device and the computing device, wherein the first user device comprises a camera and is configured to:
  - receive the transaction information from the computing device via the communication network;
  - display on the first user device a split option query user interface based on the transaction information, the split option query user interface presenting a split option control by which the first user may indicate that the transaction should be split; and
  - based on an affirmative input to the split option control:
    - acquire a picture of a bill or receipt associated with the transaction via the camera;
    - populate a split request adjustment user interface, displayed by the first user device, with values based on the transaction information and the picture of the bill or receipt, the values including automatically generated suggested payment amounts each corresponding to either the first user or to one of one or more other parties;
    - display, on the first user device, the split request adjustment user interface, including manual adjustment controls by which the first user may enter one or more requested payment amount inputs to manually adjust the suggested payment amounts to create corresponding one or more requested payment amounts; and display, on the first user device, a Quick Response (QR) code corresponding to the transaction after creating the one or more requested payment amounts;

receiving, from the first user device, via the communication network, based on the one or more requested payment amount inputs to the split request adjustment user interface, split request information corresponding to the transaction, wherein the split request information specifies how to split the transaction with the one or more other parties, the split request information including the one or more requested payment amounts and identifiers for corresponding ones of the one or more other parties;

generating, based on the split request information, including the one or more requested payment amounts, a split request webpage,
wherein the QR code encodes a split request link to the split request webpage,
wherein the first user device is further configured to send the split request link to a second user device, associated with a second user from among the one or more other parties, based on the split request information, via the QR code as displayed on the first user device,
wherein, when the split request webpage is rendered in a web browser of the second user device, the split request webpage comprises:
respective input fields for each of the one or more other parties, including a respective payer account identifier field and a requested payment amount field that is initially populated with a corresponding one of the one or more requested payment amounts,
a manual adjustment control of a user interface of the web browser of the second user device configured to receive a manual adjustment of one of the one or more requested payment amounts, wherein the manual adjustment comprises an adjustment to an amount of the transaction the second user will pay, to create a corresponding one of actual payment amounts associated with the transaction, and
an input of the user interface of the web browser of the second user device configured to receive an entry of a payer account identifier of the second user;
sending the split request webpage to the second user device;
receiving, based on the input of the user interface of the web browser of the second user device after rendering the split request webpage, the payer account identifier of the second user and the corresponding one of the actual payment amounts for the second user;
sending a payment request for the corresponding one of the actual payment amounts for the second user to a payer account corresponding to the payer account identifier of the second user; and
instructing transfer of monetary assets in the corresponding one of the actual payment amounts for the second user from a payment account associated with the second user to the payment account associated with the first user.

9. The system of claim 8, wherein the split request information further includes the picture of the bill or receipt, a transaction tip amount, a reminder mode value, a reminder frequency value, and a payee account identifier.

10. The system of claim 8, wherein the suggested payment amounts are automatically generated based on text detected from the picture of the bill or receipt associated with the transaction.

11. The system of claim 8, wherein the split request webpage displays the input fields, the transaction amount, the one or more requested payment amounts for each of the other parties, the picture of the bill or receipt corresponding to the transaction, and a transaction tip amount.

12. The system of claim 8, wherein the split request adjustment user interface of the first user device is configured to permit the first user to populate or modify a transaction tip amount in the split request adjustment user interface, and wherein the one or more requested payment amounts in the split request webpage each include a respective requested portion of the transaction tip amount that is based on the transaction tip amount.

13. The system of claim 8, wherein the operations further comprise:
generating a notification on the first user device when the payer account identifier and the corresponding one of the actual payment amounts for the second user are received.

14. The system of claim 8, wherein the operations further comprise:
generating a notification on the first user device when the payment request to the payer account of the second user for the corresponding one of the actual payment amounts for the second user is fulfilled.

15. A non-transitory computer-readable medium having instructions stored thereon that, when executed by at least one computing device, cause the at least one computing device to perform operations comprising:
receiving, from a payment network, transaction information specifying a transaction, after the transaction has been processed by the payment network based on payment account information of a payment account associated with a first user, wherein the transaction information includes at least one of merchant information, location information, time information, a transaction amount, or merchant point of sale system information;
transmitting the transaction information to a first user device associated with the first user, via a communication network communicatively coupling the first user device and the at least one computing device, wherein the first user device comprises a camera and is configured to:
receive the transaction information from the computing device via the communication network;
display on the first user device a split option query user interface based on the transaction information, the split option query user interface presenting a split option control by which the first user may indicate that the transaction should be split; and
based on an affirmative input to the split option control:
acquire a picture of a bill or receipt associated with the transaction via the camera;
populate a split request adjustment user interface, displayed by the first user device, with values based on the transaction information and the picture of the bill or receipt, the values including automatically generated suggested payment amounts each corresponding to either the first user or to one of one or more other parties;
display, on the first user device, the split request adjustment user interface, including manual adjustment controls by which the first user may enter one or more requested payment amount inputs to manually adjust the suggested payment amounts to create corresponding one or more requested payment amounts; and display, on the first user device, a Quick Response (QR) code corresponding to the transaction after creating the one or more requested payment amounts;

receiving, from the first user device, via the communication network, based on the one or more requested payment amount inputs to the split request adjustment user interface, split request information corresponding to the transaction, wherein the split request information specifies how to split the transaction with the one or more other parties, the split request information including the one or more requested payment amounts and identifiers for corresponding ones of the one or more other parties;

generating, based on the split request information, including the one or more requested payment amounts, a split request webpage,
wherein the QR code encodes a split request link to the split request webpage,
wherein the first user device is further configured to send the split request link to a second user device, associated with a second user from among the one or more other parties, based on the split request information, via the QR code as displayed on the first user device,
wherein, when the split request webpage is rendered in a web browser of the second user device, the split request webpage comprises:
respective input fields for each of the one or more other parties, including a respective payer account identifier field and a requested payment amount field that is initially populated with a corresponding one of the one or more requested payment amounts,
a manual adjustment control of a user interface of the web browser of the second user device configured to receive a manual adjustment of one of the one or more requested payment amounts, wherein the manual adjustment comprises an adjustment to an amount of the transaction the second user will pay, to create a corresponding one of actual payment amounts associated with the transaction, and
an input of the user interface of the web browser of the second user device configured to receive an entry of a payer account identifier of the second user;

sending the split request webpage to the second user device;

receiving, based on the input of the user interface of the web browser of the second user device after rendering the split request webpage, the payer account identifier of the second user and the corresponding one of the actual payment amounts for the second user;

sending a payment request for the corresponding one of the actual payment amounts for the second user to a payer account corresponding to the payer account identifier of the second user; and instructing transfer of monetary assets in the corresponding one of the actual payment amounts for the second user from a payment account associated with the second user to the payment account associated with the first user.

16. The non-transitory computer-readable medium of claim 15, wherein the split request information further includes the picture of the bill or receipt, a transaction tip amount, a reminder mode value, a reminder frequency value, and a payee account identifier.

17. The non-transitory computer-readable medium of claim 15, wherein the split request webpage displays the input fields, the transaction amount, the one or more requested payment amounts for each of the other parties, the picture of the bill or receipt corresponding to the transaction, and a transaction tip amount.

18. The non-transitory computer-readable medium of claim 15, wherein the suggested payment amounts are automatically generated based on text detected from the picture of the bill or receipt associated with the transaction.

19. The non-transitory computer-readable medium of claim 15, wherein the split request adjustment user interface of the first user device is configured to permit the first user to populate or modify a transaction tip amount in the split request adjustment user interface, and wherein the one or more requested payment amounts in the split request webpage each include a respective requested portion of the transaction tip amount that is based on the transaction tip amount.

20. The non-transitory computer-readable medium of claim 15, wherein the operations further comprise:
generating a notification on the first user device when the payer account identifier and the corresponding one of the actual payment amounts for the second user are received.

* * * * *

UNITED STATES PATENT AND TRADEMARK OFFICE
CERTIFICATE OF CORRECTION

| | | |
|---|---|---|
| PATENT NO. | : 12,307,427 B2 | Page 1 of 1 |
| APPLICATION NO. | : 18/093471 | |
| DATED | : May 20, 2025 | |
| INVENTOR(S) | : Ryan et al. | |

It is certified that error appears in the above-identified patent and that said Letters Patent is hereby corrected as shown below:

In the Claims

In Column 14, Claim 1, Line 61, after "inputs" delete "from a".

In Column 15, Claim 1, Line 8, after "send" delete "sending,".

In Column 15, Claim 1, Line 19, delete "fields" and insert -- field --, therefor.

In Column 16, Claim 5, Line 2, before "webpage" delete "comprises a".

In Column 16, Claim 6, Line 10, after "payment" delete "amount".

In Column 16, Claim 7, Line 17, before "amounts" delete "amount".

Signed and Sealed this
Eighth Day of July, 2025

Coke Morgan Stewart
*Acting Director of the United States Patent and Trademark Office*